US008254875B2

(12) United States Patent
Stählin

(10) Patent No.: US 8,254,875 B2
(45) Date of Patent: Aug. 28, 2012

(54) VEHICLE EMERGENCY CALL SYSTEM FOR TRANSMITTING ADDITIONAL OR MODIFIED DATA

(75) Inventor: Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 131 days.

(21) Appl. No.: 12/746,300

(22) PCT Filed: Apr. 25, 2008

(86) PCT No.: PCT/EP2008/055091
§ 371 (c)(1), (2), (4) Date: Jun. 4, 2010

(87) PCT Pub. No.: WO2009/071339
PCT Pub. Date: Jun. 11, 2009

(65) Prior Publication Data
US 2010/0267358 A1 Oct. 21, 2010

(30) Foreign Application Priority Data

Dec. 6, 2007 (DE) ......................... 10 2007 059 618
Mar. 27, 2008 (DE) ......................... 10 2008 015 840

(51) Int. Cl.
*H04M 11/04* (2006.01)

(52) U.S. Cl. ............... 455/404.1; 455/404.2; 455/575.9; 455/569.2

(58) Field of Classification Search ............... 455/404.1, 455/404.2, 414.1, 414.3, 466, 575.7, 575.9, 455/450, 451, 452.1, 569.1, 569.2; 340/436, 340/904, 989
See application file for complete search history.

(56) References Cited

U.S. PATENT DOCUMENTS

| | | | | |
|---|---|---|---|---|
| 4,369,426 | A | 1/1983 | Merkel | |
| 2002/0005804 | A1* | 1/2002 | Suprunov | 342/457 |
| 2002/0103622 | A1* | 8/2002 | Burge | 702/183 |
| 2002/0197977 | A1 | 12/2002 | Brooks | |
| 2004/0142678 | A1 | 7/2004 | Krasner | |
| 2004/0145496 | A1* | 7/2004 | Ellis | 340/905 |
| 2005/0111630 | A1 | 5/2005 | Potorny et al. | |
| 2005/0209770 | A1* | 9/2005 | O'Neill et al. | 701/117 |
| 2005/0255834 | A1* | 11/2005 | Steingruebner | 455/414.1 |
| 2005/0267651 | A1* | 12/2005 | Arango et al. | 701/3 |
| 2006/0223491 | A1* | 10/2006 | Freeburg | 455/404.1 |

(Continued)

FOREIGN PATENT DOCUMENTS

DE 29 12 547 10/1980

(Continued)

OTHER PUBLICATIONS

International Search Report for PCT/EP2008/055091 issued Aug. 7, 2008.

(Continued)

*Primary Examiner* — Jean Gelin
(74) *Attorney, Agent, or Firm* — RatnerPrestia

(57) ABSTRACT

An emergency call device, system and method for a vehicle is specified in which, on occurrence of a certain event, a data record is generated which thereupon is transmitted during an emergency call. The event may be an external request by an operator or a trigger signal inside a vehicle. In this way, the operator may obtain the most recent information at any time during the emergency call.

16 Claims, 2 Drawing Sheets

U.S. PATENT DOCUMENTS

| | | | | |
|---|---|---|---|---|
| 2007/0132564 | A1 * | 6/2007 | Dickmann et al. | 340/436 |
| 2008/0122592 | A1 * | 5/2008 | Shimizu | 340/425.5 |
| 2009/0088141 | A1 * | 4/2009 | Suurmeyer et al. | 455/416 |
| 2009/0207007 | A1 | 8/2009 | Flick et al. | |

FOREIGN PATENT DOCUMENTS

| | | |
|---|---|---|
| DE | 94 06 115 | 6/1994 |
| DE | 44 21 508 | 12/1994 |
| DE | 196 50 176 | 6/1997 |
| DE | 298 18 032 | 12/1998 |
| DE | 197 48 992 | 5/1999 |
| DE | 10 2004 061399 | 7/2006 |
| EP | 1 280 120 | 1/2003 |
| JP | 06-0 20 191 | 1/1994 |

OTHER PUBLICATIONS

German Search Report for DE 10 2008 015 840.2 dated Mar. 5, 2009.

* cited by examiner

VEHICLE EMERGENCY CALL SYSTEM FOR TRANSMITTING ADDITIONAL OR MODIFIED DATA

CROSS REFERENCE TO RELATED APPLICATIONS

This application is the U.S. national phase application of PCT International Application No. PCT/EP2008/055091, filed Apr. 25, 2008, which claims priority to German Patent Application No. DE 10 2007 059 618.0, filed Dec. 6, 2007, and German Patent Application No. 10 2008 015 840.2, filed Mar. 27, 2008, the contents of such applications being incorporated herein by reference.

FIELD OF THE INVENTION

The invention relates to the emergency call and safety technology for vehicles. In particular, the invention relates to an emergency call device for a vehicle for transmitting an emergency call, an emergency call system, the use of an emergency call device in a vehicle, a method, a computer program product and a computer-readable medium.

BACKGROUND OF THE INVENTION

In the case of an automated emergency call (eCall), a set of data is normally transmitted once at the beginning of the emergency call and then the system switches to voice mode in which the emergency call is then completed. If, for example, a vehicle passenger leaves the vehicle during the emergency call, this generally remains hidden from the operator of the emergency call center.

SUMMARY OF THE INVENTION

An object of the present invention to provide an improved emergency call for a vehicle which, in particular, is adapted to changing conditions.

The present invention relates to an emergency call device of a vehicle for transmitting an emergency call, an emergency call system, a use, a method, a computer program product and a computer-readable medium according to the features of the independent claims. Developments of the invention are obtained from the subclaims.

The exemplary embodiments described relate in equal measure to the emergency call device, the emergency call system, the use, the method, the computer program product and the computer-readable medium.

According to one exemplary embodiment of the invention, an emergency call device for a vehicle for transmitting an emergency call is specified which comprises a communication unit for transmitting the emergency call to a receiving device outside the vehicle and a control unit for controlling the communication unit. The emergency call is transmitted at least partially via a voice channel. Furthermore, the control unit is constructed, on occurrence of a certain event, to generate a data record which thereupon is transmitted during the emergency call.

For example, the data record can be requested by the operator of the external receiving device. The generation of the data record can also be triggered internally by the vehicle electronics when the vehicle sensor system detects a corresponding event. If, for example, a passenger leaves the vehicle, this is registered by the vehicle sensor system which thereupon generates a corresponding data record and sends it to the external receiving device.

In other words, the traditional dichotomy of an automated emergency call (first the digital data transmission and then the opening of the voice channel for the communication between the passenger and the operator) is canceled. Instead, measurement data and the like can be transmitted at any time, if required.

According to a further exemplary embodiment of the invention, the certain event is a data request from the receiving device to the control unit during the transmission of the emergency call.

If the operator thus determines that he needs additional data, he can simply request these. It is thus not required, e.g., that all data are transmitted before the beginning of the voice communication. An external operator of an emergency call center thus has the capability of requesting new data from the vehicle in the course of the conversation at any time.

In this manner, measurement data of the vehicle sensor system may be selectively requested.

According to a further exemplary embodiment of the invention, the data request is based on a predetermined tone sequence.

Thus, the operator has the capability of generating the tone sequence via a key input of his computer or mobile telephone e.g. during the voice link (for example as in the case of a remote control at an answering machine or as in the case of automated hotlines), and again to request data in this manner. These data are then sent by the vehicle and then subsequently switches back into voice mode.

According to a further exemplary embodiment of the invention, the emergency call device comprises a detection unit for detecting measurement values, the certain event being the transgression of a predetermined threshold value of a detected measurement value.

It is thus possible that the vehicle independently repeats the transmission of a data record if data from a data record originally transmitted (which has been transmitted, e.g. in the form of a data packet) have greatly changed. Such a transmission can also be carried out when certain data have hitherto not been transmitted and have exceeded a certain limit value.

According to a further exemplary embodiment of the invention, the data record is transmitted via a voice channel. For example, the communication link between the communication unit and the external receiving device is a narrow-band communication link. In this manner, inexpensive, narrow-band receiving devices may also be used.

According to a further exemplary embodiment of the invention, the control unit, for the purpose of generating the data record in the form of voice information, has a speech synthesizer which is constructed for converting data by means of speech synthesis.

According to a further exemplary embodiment of the invention, the communication unit and the control unit are constructed for optionally transmitting the data in text form or as pre-converted data in response to a request by the receiver.

The receiver may thus decide whether it wishes to have the data as audio data or video data or in text form, e.g. as SMS. It is also possible that the receiver selects that, for example, the location of the vehicle should be transmitted in text form whereas other information is to be transmitted as speech.

The term media conversion quite generally designates the transfer, transformation or conversion of a file from one file format into another one. This applies both to the transfer of data between different media and file systems and to the transmission of data from one storage medium to another one.

According to a further exemplary embodiment of the invention, the data record is transmitted during the emergency call in the form of a three-party call, the first party of the three-party call being an occupant of the vehicle, the second party of the three-party call being an operator of the receiving device and the third party of the three-party call being the control unit.

By using media conversion in the form of text-to-speech, that is to say the conversion of data into voice information, and by implementing a three-party call circuit, both the operator and the occupants of the vehicle can check the data which are also transmitted by the communication unit. If this should be a wrong measurement, this may be expressed to the operator by an occupant of the vehicle.

According to a further exemplary embodiment of the invention, the emergency call is transmitted from the beginning via the voice channel so that the operator can speak to the occupants of the vehicle already at the beginning of the emergency call.

In this manner, an exchange between rescue coordination center and occupants can take place from the start without measurement data being previously transmitted.

According to a further exemplary embodiment of the invention, the emergency call device also comprises an output unit, the control unit being constructed for transmitting an output signal to the output unit in order to signal visually or audibly to the occupants of the vehicle that the data record is being transmitted to the receiving device.

In this manner, the occupants of the vehicle can recognize when the data record is being transmitted so that, for example, they are not surprised if there is no feedback from the operator at this time. The audible signals of the occupants of the vehicle produced during the data transmission can be temporarily buffered inside the vehicle in order to be transmitted at a later time.

According to a further exemplary embodiment of the invention, the receiving device is a mobile terminal. The automated emergency call can thus be received by a multiplicity of mobile receivers which may then forward the emergency call to other mobile receivers or to a central station.

According to a further exemplary embodiment of the invention, the communication unit 122 is a permanently installed Network Access Device (NAD).

According to a further exemplary embodiment of the invention, the emergency call is an automated emergency call.

A user input for transmitting the emergency call is not required, but possible.

According to a further exemplary embodiment of the invention, the use in a vehicle of an emergency call device described above is specified.

According to a further exemplary embodiment of the invention, an emergency call system is specified which an emergency call device described above and a receiving device for receiving the emergency call and for requesting data from the emergency call device.

According to a further exemplary embodiment of the invention, a method for transmitting an emergency call from a vehicle to a receiving device is specified in which the emergency call is transmitted to the receiving device, the emergency call being transmitted at least partially via a voice channel, and in which a data record is generated on the occurrence of a certain event, which thereupon is transmitted during the emergency call.

According to a further exemplary embodiment of the invention, a computer program product is specified which, when executed on a processor, instructs the processor to carry out the method steps described above.

According to a further exemplary embodiment of the invention, a computer-readable medium is specified on which a computer program product is stored which, when executed on a processor, instructs the processor to execute the steps described above.

The cableless transmission or the cableless reception, respectively (that is to say the communication between the communication unit and the external receiving device) takes place by GSM, UMTS, LTE, WLAN (e.g. 802.11p) or also by WiMax. It is also possible to use other transmission protocols.

The vehicle is, for example, a motor vehicle such as a car, a bus or a truck, or also a rail vehicle, a ship, an aircraft such as a helicopter or airplane, or, for example, a bicycle.

Furthermore, it should be pointed out that, in the context of the present invention, GPS is representative of all global navigation satellite systems (GNSS) such as, e.g., GPS, Galileo, GLONASS (Russia), Compass (China), IRNSS (India), and of other positioning systems which supply an absolute position such as, e.g. positioning based on WLAN.

An aspect of the invention may be seen in that the operator, during the voice link, has the possibility of requesting data again. These data are then sent automatically by the vehicle. There is also the possibility that the vehicle itself initiates the retransmission of data. The data transmission takes place either via the voice channel after a text-to-speech conversion or via another channel whereupon the system subsequently switches back into voice mode.

Furthermore, it is possible to provide a three-party call between occupants of the vehicle, operator and control unit.

BRIEF DESCRIPTION OF THE DRAWINGS

In the text which follows, preferred exemplary embodiments of the invention are described with reference to the figures.

DETAILED DESCRIPTION

The representations in the figures are diagrammatic and not to scale.

In the description of the figures following, identical reference numbers are used for the same or similar elements.

Figure 1:
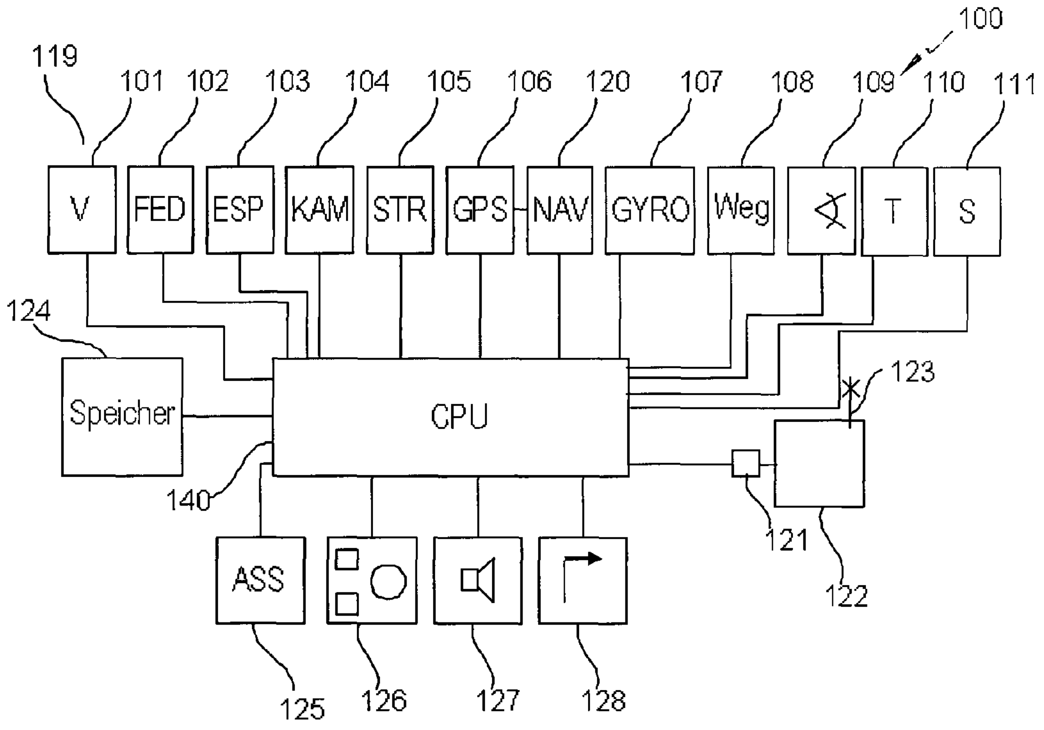
FIG. 1 shows a diagram representation of an emergency call device according to one exemplary embodiment of the invention.

FIG. 1 shows a diagrammatic representation of components of an emergency call device 100 which, for example, is installed in a vehicle. The emergency call device 100 has a control unit 140 and a communication unit 122 with an antenna 123. Furthermore, a detection device 119 is provided.

The data to be sent, which are transmitted to the communication unit 122 from the control unit 140 which, for example, is constructed in the form of a CPU, can be encrypted via an encryption device 121. Similarly, the received data which are transmitted from the communication unit 122 to the control unit 140 can be decrypted by the encryption unit 121.

The risk of misuse can be reduced in this manner.

The communication unit 122 can be connected as mobile handset or as permanently installed network access device (NAD), that is to say, e.g. by Bluetooth (when using the mobile device) or by cable (when using the NAD).

The control unit 140 is connected to an input unit 126. By means of the input unit 126, various adjustments of the communication device and possibly also of an associated navigation unit 120 can be carried out.

Furthermore, a visual output unit in the form of a monitor 128 is provided on which, for example, route guidance information can be output. In addition, the route guidance information can also be output via the sound output unit 127. Output via the sound output unit 127 has the advantage that the driver is diverted less from the current traffic situation.

During the data link for transmitting the (additional) data from the communication unit 122 to the external receiving device, it is possible to signal to the vehicle occupants by visual signal or by synthetic voice output that the data are being transmitted. The monitor 128 and the sound output unit 127 are also provided for this purpose.

In a storage element 124 which is connected to the control unit 140 or is integrated in the control unit 140, digital map data are stored (e.g. as navigation map data) in the form of data records. For example, additional information about traffic restrictions, infrastructure facilities and the like are also stored in the storage element 124 and correlated with the data records.

Furthermore, a driver assistance system 125 can be provided which is supplied with the digital map data or other information.

To determine the current vehicle position, the emergency call device 100 has a navigation unit 120 with a satellite navigation receiver (positioning unit) 106 which is constructed for receiving positioning signals from, for example, Galileo satellites or GPS satellites. Naturally, the positioning unit 106 can also be constructed for other satellite navigation systems.

The positioning unit 106 is connected to the control unit 140. The navigation unit 120 is also connected to the control unit 140. Furthermore, there is a direct link between the navigation unit 120 and the positioning unit 106. The GPS signals can thus be transmitted directly to the CPU 140.

Since the positioning signals cannot always be received, for example in the inner city area, the detection unit 119 of the emergency call device 100 also has a direction sensor 107, a mileage sensor 108, a steering wheel angle sensor 109, a spring travel sensor 102, an ESP sensor system 103 and possibly an optical detector 104, for example in the form of a camera, in order to carry out compound navigation. Also, a beam sensor 105 (radar or lidar sensor) can be provided. Furthermore, the detection unit 119 has a speedometer 101, a temperature gauge 110 and one or more sensors 111 for detecting a seat occupancy.

The signals of the GPS receiver 106 and the other sensors are processed in the control unit 140. The vehicle position determined from these signals is matched with the road maps via map matching. The route guidance or position information obtained in this manner is finally output via the monitor 128. Furthermore, this information can be transmitted to the external receiving device during the emergency call.

The communication unit 122 can receive an external trigger signal in the form of a request from the external receiving device, which signal is then transferred to the CPU 140. Furthermore, the detection unit 119 can detect measurement data which are then also transferred to the CPU 140. The CPU then analyses these measurement data and compares them with predetermined threshold values. If such a threshold value is exceeded or if the CPU receives a trigger signal from the external receiving device, it generates a corresponding data record which is thereupon transmitted automatically during the emergency call.

Such subsequent or additional data requests can be appropriate, e.g., when the car is moving on after the first transmission of the data, e.g. due to being located on a slope, and the operator wishes to obtain new position information. A further example is that the operator would like to know the temperature in order to find out whether there is fire in or around the vehicle. A further example is that the operator wishes to know the current seat occupancy in the vehicle in order to find out whether persons have left the vehicle or have newly entered the vehicle (e.g. helpers).

It is also possible that the vehicle by itself switches again to data transmission if data from the last data packet sent have greatly changed or data previously not transmitted have exceeded a limit value. Causes of this can be:

The vehicle has moved farther after the original transmission of the position.

The temperature in or around the vehicle has risen above a certain limit value, for example due to a fire, or the temperature has dropped below a certain limit value, for example due to severe cold in the accident region.

The seat occupancy has changed. This allows the leaving of a vehicle occupant or the arrival of a helper to be inferred.

The beginning of raining, detected by a rain sensor or, for example, the camera 104.

The battery voltage drops below a threshold value as a result of which there is a risk that the vehicle electrical system will no longer be able to provide sufficient electrical energy in the near future so that the communication link could break down.

In all cases, the (additional) data can also be transmitted by means of text-to-speech in order to be more independent of the performance of the emergency call center or of a mobile receiving device.

Due to the subsequent or additional data transmission, it is possible to respond flexibly to changing conditions. If text-to-speech is then used, this function is independent of the performance of the emergency call center and only a normal telephone link is needed by the emergency call center.

Furthermore, a three-party call can be provided. If, for example, data are subsequently requested by the operator, these are transmitted in voice mode (text-to-speech). However, these data are not transmitted only to the operator but also to the vehicle occupants, that is to say like a three-party call, the computer (CPU 140) being the third party.

The vehicle occupants thus have the capability of noting, and subsequently correcting, errors in the system. Thus, e.g., the positioning may not be correct (because the system assumes, e.g., that the car is located on a bridge but the car is actually located underneath the bridge). Furthermore, the number of vehicle occupants could be reproduced incorrectly.

According to aspects of the invention, further requests by an operator are made possible in order to be able to answer further enquiries from a rescue coordination center without also including the vehicle occupants.

The subsequent request for data by the operator (or the subsequent sending of the data by a trigger mechanism inside the vehicle with the aid of the detection unit) also ensures that it is possible to speak to the vehicle occupants immediately (not only after the transmission of the data) and nevertheless the data can be received in time in the receiving device.

The invention can also be used in addition to an in-band transmission such as, e.g. obtainable from the company Airbiquity in order to check the data or to enquire again if it is assumed that there have been changes in the data. In-band transmission or in-band modem is a technology which takes place via the telephone line similar to the old modems. That is to say, data are modulated into the voice channel (the voice channel cannot be used for speech during the data transmission).

Figure 2:
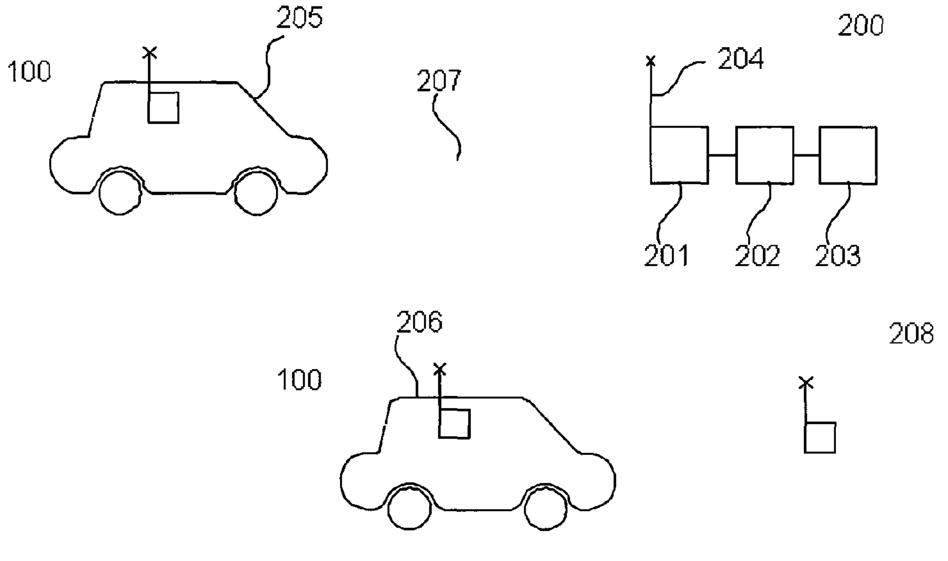
FIG. 2 shows a diagram representation of the emergency call system according to one exemplary embodiment of the invention.

FIG. 2 shows a diagrammatic representation of an emergency call system which has an accident vehicle 205 with an emergency call device 100, a central station 200, a mobile receiving device 208 for, e.g., a rescue assistant, and a further vehicle 206 with a second emergency call device 100.

The central station 200 comprises a communication unit 201 with an antenna 204, a central server 202 and a data memory 203.

The mobile receiving device 208 is, for example, a mobile telephone or a PDA. The receiving device can also be a further emergency call device 100 installed in a second vehicle 206.

All data are transmitted via the radio transmission link 207.

The central station 200 is a rescue coordination center which can carry out the rescue coordination fully automatically.

Figure 3:
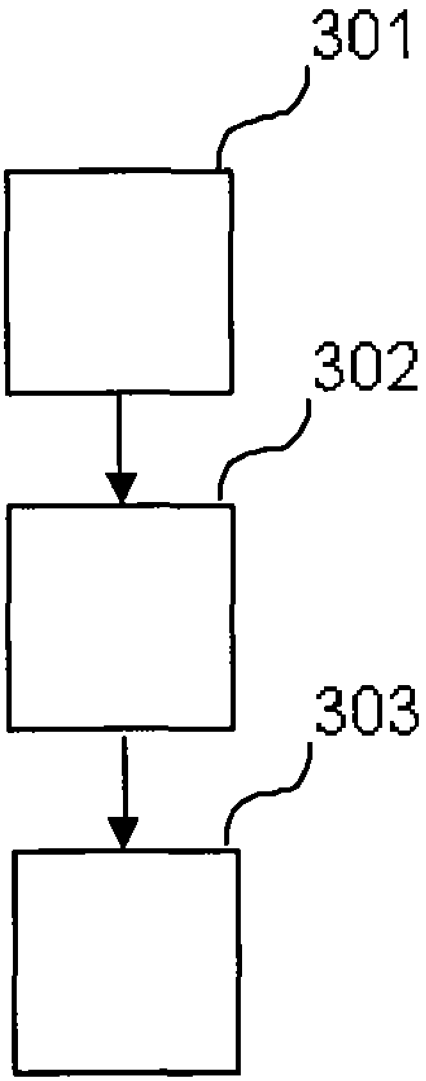
FIG. 3 shows a flowchart of a method according to one exemplary embodiment of the invention.

FIG. 3 shows a flowchart of a method in which an emergency call is transmitted in step 301. During the conversation between vehicle occupants and an operator of a rescue coordination center, data are subsequently transmitted from the vehicle to an external receiving device in step 302. The data transmission is triggered, for example, by the operator similarly to an automated hotline or the remote control of an answering machine. The subsequent data transmission can also be initiated by the vehicle itself because corresponding original data have changed by a correspondingly great amount or because a threshold value of data not yet transmitted has been exceeded.

After the completed data transmission, the emergency call device switches back to voice transmission automatically. Audible signals of the vehicle occupants which have been detected during the subsequent data transmission have been recorded and can now be sent (step 303).

It should additionally be pointed out that "comprising" and "having" does not exclude other elements or steps and "one" does not exclude a multiplicity. Furthermore, it should be pointed out that features or steps which have been described with reference to one of the above exemplary embodiments can also be used in combination with other features or steps of other exemplary embodiments described above.

The invention claim is:

1. An emergency call device for a vehicle for transmitting an emergency call, the emergency call device comprising:

a communication unit for transmitting the emergency call to a receiving device outside the vehicle, the emergency call including a voice data and a vehicle data;

a control unit for controlling the communication unit to select between transmitting one of the voice data and the vehicle data over a communication channel based on the vehicle data or instructions from the receiving device, the communication channel being common to both the voice data and the vehicle data during the emergency call; and a detection unit for detecting measurement values, wherein the detected measurement values are compared to a predetermined threshold value, and if the predetermined threshold value is exceeded, a data record based on the measurement values is transmitted during the emergency call.

2. The emergency call device as claimed in claim 1, wherein the instructions request the vehicle data from the control unit during the transmission of the emergency call.

3. The emergency call device as claimed in claim 2, wherein the data request is based on a predetermined tone sequence.

4. The emergency call device as claimed in claim 1, wherein the vehicle data and voice data are transmitted via a voice channel.

5. The emergency call device as claimed in claim 4, wherein the control unit, for the purpose of generating the vehicle data in the form of voice information, comprises a speech synthesizer which is configured to convert data by means of speech synthesis.

6. The emergency call device as claimed in claim 1, wherein the voice data and the vehicle data are transmitted during the emergency call in the form of a three-party call;

the first party of the three-party call being an occupant of the vehicle the vehicle;

the second party of the three-party call being an operator of the receiving device; and the third party of the three-party call being the control unit.

7. The emergency call device as claimed in claim 6, wherein the emergency call is transmitted from the beginning via the voice channel so that the operator may speak to the occupants of the vehicle already at the beginning of the emergency call.

8. The emergency call device as claimed in claim 1, further comprising an output unit; and wherein the control unit is configured to transmit an output signal to the output unit in order to signal visually or audibly to the occupants of the vehicle that the data record is being transmitted to the receiving device.

9. The emergency call device as claimed in claim 1, wherein the receiving device is a mobile terminal.

10. The emergency call device as claimed in claim 1, wherein the communication unit is a permanently installed network access device.

11. The emergency call device as claimed in claim 1, wherein the emergency call is an automated emergency call.

12. An emergency call system comprising:

an emergency call device as claimed in claim 1; and a receiving device for receiving the emergency call and for requesting data from the emergency call device.

13. The use of an emergency call device as claimed in claim 1 in a vehicle.

14. A method for transmitting an emergency call from a vehicle to a receiving device, the method comprising the steps:

transmitting the emergency call to the receiving device, the emergency call including a voice data and a vehicle data;

selecting between transmitting one of the voice data and the vehicle data over a communication channel based on the vehicle data or instructions from the receiving device, the communication channel being common to both the voice data and the vehicle data; and detecting measurement values, wherein the detected measurement values are compared to a predetermined threshold value, and if the predetermined threshold value is exceeded, a data record based on the measurement values is transmitted during the emergency call.

15. A method as claimed in claim 14, wherein the voice data and the vehicle data being transmitted during the emergency call in the form of a three-party call;

the first party of the three-party call being an occupant of the vehicle;

the second party of the three-party call being an operator of the receiving device; and the third party of the three-party call being the control unit.

16. A non-transitory computer-readable medium on which a computer program product is stored which, when executed on a processor, instructs the processor to carry out the following steps:

transmit the emergency call to receiving device, the emergency call including a voice data and a vehicle data;

select between transmitting one of the voice data and the vehicle data over a common communication channel based on the vehicle data or instructions from the receiving device, the communication channel being common to both the voice data and the vehicle data; and detect measurement values, wherein the detected measurement values are compared to a predetermined threshold value, and if the predetermined threshold value is exceeded, a data record based on the measurement values is transmitted during the emergency call.

* * * * *